(12) United States Patent
Knuebel et al.

(10) Patent No.: US 11,311,093 B2
(45) Date of Patent: Apr. 26, 2022

(54) METHOD FOR DETERMINING A CROSS-MANUFACTURER HAIR DYE RECOMMENDATION

(71) Applicant: Henkel AG & Co. KGaA, Duesseldorf (DE)

(72) Inventors: Hans Georg Knuebel, Duesseldorf (DE); Annika Koenen, Grevenbroich (DE); Lucile Bonnin, Berlin (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 156 days.

(21) Appl. No.: 16/648,599

(22) PCT Filed: Oct. 1, 2018

(86) PCT No.: PCT/EP2018/076637
§ 371 (c)(1),
(2) Date: Mar. 18, 2020

(87) PCT Pub. No.: WO2019/068636
PCT Pub. Date: Apr. 11, 2019

(65) Prior Publication Data
US 2021/0361051 A1 Nov. 25, 2021

(30) Foreign Application Priority Data
Oct. 5, 2017 (DE) ..................... 10 2017 217 731.4

(51) Int. Cl.
*A45D 44/00* (2006.01)
*G01J 3/02* (2006.01)
*G01J 3/46* (2006.01)

(52) U.S. Cl.
CPC .......... *A45D 44/005* (2013.01); *G01J 3/0264* (2013.01); *G01J 3/462* (2013.01); *G01J 3/463* (2013.01); *A45D 2044/007* (2013.01)

(58) Field of Classification Search
CPC . A45D 44/005; A45D 2044/007; G01J 3/462; G01J 3/463; G01J 3/0264
See application file for complete search history.

(56) References Cited

U.S. PATENT DOCUMENTS 6,067,504 A * 5/2000 MacFarlane ......... A61B 5/0059
702/1
6,330,341 B1 12/2001 Macfarlane et al.
(Continued)

FOREIGN PATENT DOCUMENTS

DE 102015225459 A1 6/2017
WO 2017103050 A1 6/2017

OTHER PUBLICATIONS

EPO, International Search Report issued in International Application No. PCT/EP2018/076637, dated Jan. 11, 2019.

*Primary Examiner* — Dominic J Bologna
(74) *Attorney, Agent, or Firm* — Lorenz & Kopf, LLP (57) ABSTRACT

A method for determination of a cross-manufacturer hair coloration agent recommendation is provide. The method includes the allocation of a number of hair coloration agents to respectively one standard source hair color of a number of source hair colors, a coloration of hair samples with the number of hair coloration agents, a colorimetric measurement of the number of hair samples, a determination of a color difference between each of the number of colors, an allocation of each of the hair coloration agents with unknown composition to one of the hair coloration agents with known composition in such a way that the color difference is minimized, a determination of the user source hair color, a determination of the user's desired hair color, a determination of a first recommended hair coloration agent from the number of hair coloration agents of known composition and of a second recommended hair coloration agent.

15 Claims, 7 Drawing Sheets

(56) References Cited

U.S. PATENT DOCUMENTS

| | | | |
|---|---|---|---|
| 2002/0010556 A1* | 1/2002 | Marapane | G01J 3/528 |
| | | | 702/32 |
| 2006/0033907 A1* | 2/2006 | Inzinna | G01J 3/462 |
| | | | 356/45 |
| 2007/0159290 A1* | 7/2007 | Grassinger | G01J 3/46 |
| | | | 336/215 |
| 2017/0038297 A1* | 2/2017 | Miklatzky | G01N 21/55 |
| 2017/0119130 A1* | 5/2017 | Witchell | A45D 44/005 |
| 2017/0156476 A1* | 6/2017 | Miklatzky | G01N 21/25 |
| 2017/0270679 A1* | 9/2017 | Koven | G01J 3/0264 |
| 2018/0310692 A1 | 11/2018 | Knuebel et al. | |
| 2018/0357390 A1 | 12/2018 | Knuebel | |

\* cited by examiner

FIG. 1-1

Continued on next page

Initial hair color BN

Desired hair color DC

Result/Dyeing result CR

FIG. 3-2

METHOD FOR DETERMINING A CROSS-MANUFACTURER HAIR DYE RECOMMENDATION

CROSS-REFERENCE TO RELATED APPLICATION

This application is a U.S. National-Stage entry under 35 U.S.C. § 371 based on International Application No. PCT/EP2018/076637, filed Oct. 1, 2018, which was published under PCT Article 21(2) and which claims priority to German Application No. 10 2017 217 731.4, filed Oct. 5, 2017, which are all hereby incorporated in their entirety by reference.

TECHNICAL FIELD

The present disclosure concerns a process and data-processing device for the determination of a cross-manufacturer recommendation for hair color.

BACKGROUND

App- or internet-based product recommendations are standard for many products today but pose a particular challenge for one product segment of hair coloration (also referred to as hair coloration agents). This is because a hair coloration result is the product of a complex interaction of an individual's hair color (also referred to as the source hair color or basic hair color) with the hair coloration agent, which can produce a variety of color results.

An individualized presentation of all these color results is therefore of great importance for a user. It can also be important for trade and for the user in this context that the user is provided with a cross-manufacturer product recommendation in order not to burden the user with multiple apps or internet pages, when it would moreover be doubtful in any case whether a comparison of results which might be obtained from different apps/internet pages is possible.

BRIEF SUMMARY

Methods and data-processing devices for determining a cross-manufacturer hair coloration agent recommendation are provided herein. In an exemplary embodiment, a method for determining a cross-manufacturer hair coloration agent recommendation includes allocating a number of hair coloration agents to respectively one standard source hair color of a number of source hair colors. The number of hair coloration agents have a number of hair coloration agents of known composition and a number of hair coloration agents of unknown composition. The hair samples are colored with the number of hair coloration agents, wherein respectively one of the hair coloration agents is applied to a hair sample with the allocated standard source hair color. A colorimetric measurement of the number of hair samples is obtained. A determination is made separately for every standard source hair color a color difference between each of the number of colors, which were colored with the hair coloration agent with unknown composition and each of the colors which were colored with the number of hair coloration agents of known composition. Each of the hair coloration agents with unknown composition is allocated to one of the hair coloration agents with known composition in such a way that the color difference is minimized. The user source hair color is determined. The user's desired hair color is determined. A first recommended hair coloration agent is determined, wherein that hair coloration agent is determined as the first recommended hair coloration agent by predictive analytics from the number of hair coloration agents of known composition, for which, when hair of the user's source color is colored, the smallest color difference between the color result and the desired hair color is to be expected. A second recommended hair coloration agent is determined, wherein the second recommended hair coloration agent is the hair coloration agent of unknown composition allocated to the first recommended hair coloration agent.

In various design examples a process (also referred to herein as "a method") is provided, which allows the provision of a cross-manufacturer hair color recommendation.

In this way, based on the user source hair color and desired hair color, a first recommended hair coloration agent can be determined which is suitable to produce the desired hair color or as near as possible when the user's hair is colored.

For the determination of a first recommended hair coloration agent a conventional process may be used in various design models, for example a process using predictive analytics such as that set out in WO 2017/103050 A1 and summarized below.

It may be necessary for the application of the predictive analytics process to have knowledge of the composition of the available hair coloration agents with respect to their color precursors. Therefore for the first recommended hair coloration agent, only those may be considered for which the composition is known. Normally the exact composition of a hair coloration agent is only known to the manufacturer itself, so that the first recommended hair coloration agent is normally produced by a first manufacturer.

In order to be able to recommend a second hair coloration agent from a second manufacturer for which the hair color result is expected to be similar to the color result produced by the first hair coloration agent, in various design models a so-called matching process (also referred to as allocation process, allocation or allocating) may initially (for example, beforehand in a laboratory) be carried out, in order to allocate a hair coloration agent for which the composition is known to every available hair coloration agent for which the composition is unknown (normally from different manufacturers to the first manufacturer).

For the allocation, each of the hair coloration agents, that is both those with known composition as well as those with unknown composition, can be applied to a hair sample.

The respective hair sample on which the coloration is carried out can have a standard source hair color from a number of standard source hair colors. In this way the standard source hair color can be assigned for the coloration with the hair coloration agent in each case by employing a so-called "medial scope". The medial scope is industry-standard information, which is normally provided with the hair coloration agent and indicates which source hair colors the hair coloration agent is suitable for.

In various design models the number of standard source hair colors can be two, three, four or five standard source hair colors. Only one standard source hair color would indicate that different standard source hair colors would have had to be combined in a group and the use of too many standard source hair colors could lead to too few hair coloration agents being allocated to a given standard source hair color to achieve a good match of the coloration agent.

If between two and five standard source hair colors are used what can be achieved is that the various "medial scopes" can be displayed in sufficiently fine gradations. Apart from that, each of the standard source hair colors can be allocated to a number of the hair coloration agents with known composition as well as a number of the hair coloration agents with unknown composition so that when allocating standard source hair colors of the given hair coloration agents with unknown composition to one of the hair coloration agents with known composition a small color difference can be achieved.

The determined allocation of the hair coloration agent with unknown composition to the hair coloration agents with known composition can be stored in a database in various design models.

The second recommended hair coloration agent can be determined by use of the determined allocation of the hair coloration with unknown composition to the hair coloration agents with known composition with the aid of the database. In this way the second recommended hair coloration agent will be the hair coloration agent which is allocated to the first recommended hair coloration agent.

In various design models a third, fourth ( . . . ) recommended hair coloration agent can be determined. Essentially, it is possible to proceed further as with the determination of the second recommended hair coloration agent. However, in contradistinction, the further recommended hair coloration agent cannot be allocated to the first recommended hair coloration agent, but to the hair coloration agent with known composition which shows the second smallest, third smallest ( . . . ) color difference to the desired color.

In various design models the process can be an integral part of providing advice electronically to the customer, which may be conducted at a point of sale of the kind that specific information relating to that point of sale, for example a general product palette of the vendor and/or current availability, can be included.

According to one design model, the process, for example software, can be configured to show to the user only those suitable products which are currently available e.g. in stock. The software can make use of information about availability (e.g. stock information) which refers to the point of sale (Point-of-Sale, PoS) at which the user is currently located. The point of sale information can be provided in various design models, for example by employing an NFC chip, a URL, a voice command or similar, which can also serve as activation signal for the software in various design models.

The point of sale information can for example be the name or address of the shop. Conclusions about the products which are available at that point of sale can be drawn from the point of sale information. In various design models, the point of sale information can be provided by the shop's operator and for example be or become stored in the database or a further database.

In this way the user is enabled not just to receive a cross-manufacturer product recommendation, which hair coloration agent is suitable to achieve their desired hair color based on their source hair color but further to ensure that the recommended product is actually available at the point of sale, or alternatively may at least be ordered there.

In various design models a filter can be deployed before a (e.g. repeated) matching procedure, whereby only those hair coloration agents are used for the allocation of the hair coloration agents, the composition of which is unknown, to the hair coloration agents, the composition of which is known, which fulfil a pre-set filter criterion.

Alternatively or additionally when allocating (matching) further to the allocation of the smallest color difference between the coloration agents, information may be recorded (e.g. in the database), which allocation (as second-best) would produce the next smallest color difference etc. This can enable the deployment of filters on the database according to the allocation and, in the event of the absence of the allocated hair coloration agent, the recommendation of the second best allocated hair coloration agent as the second recommended hair coloration agent.

In addition to availability, other criteria may be important for the user when choosing a hair coloration agent and may be included in the recommendation process (e.g. as a filter), for example wash fastness, light fastness, ability to cover gray, absence of certain ingredients (e.g. allergens), manufacturer etc.

The recommended hair coloration agent may be presented to the user visually and/or orally In various design models, the user may be shown a simulation of an expected result before or after the presentation of the hair coloration agent, which enables them to achieve or come close to achieving their desired result.

In various design models a neutral-colored tress of hair (or a digital photo of it) which has been recolored with the determined hair color result can be shown for this.

Alternatively or additionally in various design models a photo of the user can be used, which for example is taken or will be taken by a camera on a portable data-processing device, or a photo that is provided to a portable data-processing device, e.g. as transferred data.

The portable data-processing device can be configured, for example with the software or with other software, to show in the photo an area of the hair in which the user's hair is shown and to show this image after it has been altered in such a way that it produces a simulated image of the user after application of the given cosmetic product. This process may be carried out in principle in a known way. For example such a process for the imaging of newly colored hair in a digital photo of the user is well-known.

Various design models are described below.

Example 1 is a process for determining a cross-manufacturer hair coloration agent recommendation The process comprises the allocation of a number of hair coloration agents to respectively one standard source hair color of a number of standard source hair colors, where the number of hair coloration agents have a number of hair coloration agents of known composition and a number of hair coloration agents of unknown composition, a coloration of hair samples with the number of hair coloration agents, where respectively one of the hair coloration agents is applied to a hair sample with the allocated standard source hair color, a colorimetric measurement of the number of hair samples, separately for every standard source hair color a determination of the color difference between each of the number of colors which were colored with the hair coloration agent with unknown composition and each of the colors which were colored with the number of hair coloration agents of known composition, an allocation of each of the hair coloration agents with unknown composition to one of the hair coloration agents with known composition in such a way that the color difference is minimized for the hair coloration agents allocated to each other, a determination of the user source hair color, a determination of the user's desired hair color, a determination of a first recommended hair coloration agent, whereby that hair coloration agent is determined as the first recommended hair coloration agent by predictive analytics from the number of hair coloration agents of known composition, for which, when hair of the user's source hair color is colored, the smallest color difference between the color result and the desired hair color is to be expected, and the determination of a second recommended hair coloration agent, whereby the second recommended hair coloration agent is the hair coloration agent of unknown composition allocated to the first recommended hair coloration agent.

In example 2, the subject of example 1 shows that the given measured color is parameterized in a color space.

In example 3, the subject of example 2 shows that the color space is the L*a*b* color space.

In example 4, the subject of one of examples 1 to 3 shows that the number of standard source hair colors amounts to 2, 3, 4 or 5.

In example 5, the subject of one of examples 1 to 4 shows that the determination of the user's source hair color is achieved by the use of a hair color measuring device.

In example 6, the subject of one of examples 1 to 5 shows that the determination of the user's source hair color is achieved by employing selection from a number of provided source hair colors.

In example 7, the subject of one of examples 1 to 6 shows further an illustration of an expected color result as an image of a colored tress of hair or as a digital photo of the user, in which a portion of hair is displayed as a portion of hair colored with the expected color result.

In example 8, the subject of one of examples 1 to 7 shows that the allocated standard source hair color is allocated based on a specified medial scope for the given color.

In example 9, the subject of one of examples 1 to 8 shows that the allocation of each hair coloration agent of unknown composition to one of the hair coloration agents with known composition is achieved in such a way that the allocation is only achieved for those hair coloration agents that correspond in relation to a further specific characteristic.

In example 10 the specific characteristic in example 9 can be a characteristic from a group of characteristics, where the group of characteristics includes wash fastness, light fastness, the ability to cover gray, the absence of certain ingredients (e.g. allergens) and manufacturer.

Example 11 is a data-processing device for carrying out the determination of a cross-manufacturer hair coloration agent recommendation, whereby the data-processing device is configured to carry out the procedure according to one of examples 1 to 10.

In example 12, the subject of example 11 shows that the data-processing device is configured to exchange data with an external data-processing device and at least to carry out the determination of a first recommended hair coloration agent by employing the external data-processing device.

In example 13, the subject of one of examples 11 or 12 can show that the data-processing device is a portable data-processing device.

In example 14, the portable data-processing device referred to in example 13 can be a smartphone, a tablet, a laptop or a phablet/smartlet.

In example 15, the subject of one of examples 11 to 14 shows that the data-processing device has a touch-sensitive screen for recording the desired hair color and for recording an image of the expected color result.

In example 16, the subject of one of examples 11 to 15 shows that the process can be carried out through the data-processing device as an app.

In example 16, the subject of one of examples 11 to 15 shows that the process is carried out through a website and an external data-processing unit.

BRIEF DESCRIPTION OF THE DRAWINGS

The present disclosure will hereinafter be described in conjunction with the following drawing figures, wherein like numerals denote like elements, and:

The figures show, as follows:

FIG. 1 a schematic representation of a process for determining a cross-manufacturer hair coloration agent recommendation according to various design models;

FIG. 3 a flowchart for determining a cross-manufacturer hair coloration agent recommendation according to various design models.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

In the following detailed description reference is made to the attached drawings, which form part of the present notification and in which, by way of illustration, specific design models are shown, in which the present disclosure can be used. It is to be understood that other design models can be used and structural or logical changes can be made without deviating from the scope of protection of the current present disclosure. It is to be understood that the characteristics of the various exemplary design models described herein can be combined with each other, to the extent not specifically otherwise indicated. The following detailed explanation is therefore not to be read in a restrictive sense, and the scope of protection of the present disclosure is defined by the appended claims FIG. 1 shows a schematic representation 100 on four sides (divided into 100-1 to 100-4) of a process for determining a cross-manufacturer hair coloration agent recommendation according to various design models.

As 100-1 represents, a number of hair coloration agents 125 can have a number of hair coloration agents with known composition 120 (where the different compositions are labeled for the sake of example F1 to F6) and a number of hair coloration agents with unknown composition 130 (which are labeled for the sake of example F7 to F12).

In FIG. 1 the hair coloration agents with known composition 120 are marked as manufactured by a first manufacturer MA and the hair coloration agents with unknown composition 130 are marked as manufactured by other different manufacturers MB, MC, MD and ME. However, this is only by way of illustration. In various design models, the composition of the hair coloration agent may be known from more than one manufacturer, and/or the composition from more or fewer than four other manufacturers may be unknown.

Hair coloration agents can have a mixture of various color precursors. During a coloration process many different dyes may arise whose properties as pure substances are possibly not known.

Further, concentrations of dyes in the colored hair may not be known, and it may also be unknown, which concentration of the colors in the colored hair correspond to which concentration of color precursors in the hair coloration agent. This may at least partly be because the color precursors interact with each other during the development of the various colors.

Without knowing the composition of a hair coloration agent, it can therefore be difficult or impossible to predict in advance which hair color will be produced when hair with a particular source color is colored.

In order nonetheless to be able to recommend for every hair coloration agent with known composition 120 (for example from manufacturer MA) at least one further hair coloration agent of unknown composition 130 (for example from one of the manufacturers MB, MC, MD and/or ME), one allocation of the hair coloration agents with unknown composition 130 set out in 100-1 and 100-2 can be made to the hair coloration agents 120 with known composition.

For this, a number of different standard source hair colors 110 can be defined (labeled B1, B2 and B3). As described above, through the use of two to about five standard source hair colors 110 (here, for example, three) an allocation result with small color differences is to be expected, where a color difference may be considered small if the color difference between the two different colors would be perceived as minimal ($\Delta E<2.0$), only noticeable by the trained eye ($\Delta E<1.0$) or would be nearly imperceptible ($\Delta E<0.5$).

In various design models an allocation of the hair coloration agent 125 to the standard source hair color 110 can be made in such a way that each of the number of hair coloration agents 125 is allocated to one of the standard source hair colors, a number of the standard source hair colors 110.

For the allocation of the hair coloration agent 125 to the standard source hair color 110 a medial scope can be used in various design models. The medial scope is normally provided by the manufacturer together with the instructions for use, for example it may be printed on the packaging. Each of the hair coloration agents 125 can be allocated to those standard source hair colors 110 which are closest to the medial scope (e.g. show the smallest color difference to it).

As shown in 100-2, the process may further show the coloration of hair sample HP with a number of the hair coloration agents 125, where respectively one of the hair coloration agents 125 is applied to a hair sample HP with the allocated standard source hair color, so e.g. the hair coloration agent with composition F1 to the hair sample HP-B1 with the standard source hair color B1, the hair coloration agent with composition F5 to the hair sample HP-B2 with the standard source hair color B2 and the hair coloration agent with composition F12 to the hair sample HP-B3 with the standard source hair color B3.

This produces hair color results (also referred to as color results or (hair) color outcomes) which are marked in 100-2 as HP-CR1 to HP-CR3 and which can show different colors (by way of example indicated by various infilling and cross-hatching).

By using colorimetric measurement of the number of hair samples, which essentially can be achieved by known methods, for example by using a spectrometer, the hair color produced can be determined for each color result.

"Color" herein can be understood as including the interaction of the color shade (i.e. a spectral color impression, also known as hue, which may be understood to be what is seen as the "actual color"), of color intensity (i.e. how intense the color appears, e.g. compared with a neutral gray, also known as saturation, color saturation, colorfulness, chromaticity, chromaticity or depth of color) and of brightness (i.e. how bright or dark the color appears).

In various design models the color information may also show a parameterization in a known color space, for example in a L*a*b* color space (where L* indicates the brightness of a color, a* the green and red part and b* the blue and yellow part of the color; on occasion the abbreviation Lab or individually L, a or b is also used herein) in a RGB color space with color parts in Red, Green and Blue, in a CMYK color space with color parts in Cyan, Magenta, Yellow and Black, or in any other desired color space.

In various design models, a color space from which the color information (e.g. the hair color information of the colored hair or of the hair before coloring, also referred to as basic hair color) derives, or in which the color information is shown (for example, when a hair color is shown, see below) can be conditioned so that a determined or shown hair color is independent of a medium, through which the color is determined or shown (e.g. colorimeter, screen, printer, scanner, human eye etc.). The color space can, for example, be a L*a*b* color space and the color information for example a hue parameterized by a* and b*. The uniform presentation in a color space independent of medium can for example make it possible to produce a color result which is expected to be realistic, for example in that a color achieved by coloration makes the same color impression on an observer of the colored hair as in a representation of the expected result, for example what is printed on the packaging, an advertisement or a computer screen or similar.

Alternatively a different suitable color space than the L*a*b* color space can be used, e.g. CIELab or similar.

The color difference $\Delta E$ can be determined in a known way, for example as a Euclidean difference, e.g. In the form of a Euclidean distance matrix of the (L*, a*, b*) vectors of all hair colors which were targeted on the same standard source hair color 110. Alternatively, other suitable formulae for the calculation of the color difference may be used, for example $\Delta E_{94}$ after IE94 or $\Delta E_{00}$ after CIEDE2000.

The determination of the color difference can be performed in various design models separately for each standard source hair color 110 (this illustrates that the allocation of the third HP-CR2 color to the first HP-CR3 color is marked as invalid by striking through). This means that a determination of the color difference is calculated between each of the number of colors with hair coloration agents with unknown composition 130 which have been applied to standard source hair color 110, and each of the colors with hair coloration agents with known composition 120 which have been applied to standard source hair color 110.

As 100-3 shows, the process can further have an allocation of each of the hair coloration agents with unknown composition 130 to one of the hair coloration agents with known composition 120, and in such a way that the color difference $\Delta E$ is minimized for the hair coloration agents allocated to each other.

To illustrate the criterion for color difference minimization, 100-3 shows the allocation (marked as an arrow) for the colored hair samples HP-CR1, HP-CR2 and HP-CR3 instead of the respective hair coloration agent 125. Cross-hatching of similar thickness represents similar colors there and thus the colored hair samples HP-CR with similar cross-hatching thickness show a relatively small color difference. As is illustrated for the color results HP-CR1, the hair coloration agent with unknown composition 130 from the third line is not allocated to the hair coloration agent with known composition 120 from the first line for minimization of the color difference (the arrow is crossed through) but to the hair coloration agent with known composition 120 from the second line.

For determination of a first recommended hair coloration agent, in various design models the process can have a determination of a user's source hair color BN, as is shown in 100-4.

The user's source hair color BN can for example be chosen (e.g. by typing on a touch-sensitive screen, by a keyboard, a mouse, a voice command or similar) from a number of possible source hair colors.

In various design models the user's source hair color BN can be determined using a measuring device, for example a spectrometer, a camera, a colorimeter, a photometer, or another similar device.

The process can further have a determination of a desired hair color DC, for example by selecting from a menu, e.g. as described above for the user's source hair color BN.

In various design models methods which are essentially familiar, e.g. as described in WO 2017/103050 A1, from the field of predictive analytics, for which normally the corresponding English expression "predictive analytics" is used (also known as "big data" (translated literally as "large data mass"), "data mining" (translated as "analysis of large data mass") or "machine learning" (translated as "machine learning")) can be used to produce precise calculations of a hair color result despite many possible unknowns in a color mixture.

It is possible according to various design models to provide a dataset (also referred to as hair coloration data) by test colorations, which comprises as a color pre-condition parameter at least the source hair color and the coloration agent composition for each of the test colorations and as a color result parameter at least the hair color after coloration (parameterized in a color space).

The color result parameter can further in various design models have additional qualities of the colored hair color, for example light fastness, wash fastness or the ability to cover gray.

The dataset can according to various design models be used as the basis for the application of a predictive analytics process.

For example, the color pre-condition parameter or a part of the color pre-condition parameter and the color result parameter or a part of the color result parameter allocated to it can be used to produce a model which describes the dataset as precisely as possible.

In various design models, in relation to the measurement data of the dataset i.e. the measured information of the hair color data, which describes characteristics of the hair color produced by coloration (e.g. L*, a*, b* for the color, wash fastness, light fastness, coverage of gray or similar) dependent variables may be involved. By employing a complex mathematical model, which may be arrived at by employing the predictive analytics process, the dependence of the dependent variables on the independent variables (for example the concentrations of the color precursors, for example the concentrations as they present on the head ("on head")) can be modelled. This means that through the predictive analytics process a connection between the independent and dependent variables (otherwise expressed as between the color pre-condition parameters and the color result parameters) can be determined. For the color this may for example be expressed as $$L^*a^*b^* = f(c_1, c_2, c_3, c_n),$$

where L*a*b* stands for the color parameter, and $c_i$ (i=1, ..., n, n>1) for concentrations of color precursors. The function may or may not be known. Should no analytic function be known, the values of the dependent variables (of the color result parameters) can also be calculated by employing numeric algorithms.

The use of a model produced by predictive analytics allows in various design models for the determination of the hair coloration agent which, when hair of the user's source hair color BN is colored, leads to a hair color result which has the smallest difference to the user's desired hair color DC.

In 100-4, FIG. 1 illustrates that for the user's source hair color BN and the desired hair color DC the predictive analytics model for the hair coloration agent with known composition F2, which has a known composition, the color difference ΔE is minimized.

Accordingly in the example on 100-4 the first recommended hair coloration agent is F2 from manufacturer MA.

In various design models the process may also have a determination of a second recommended hair coloration agent, where the second recommended hair coloration agent is the hair coloration agent 130 of unknown composition allocated to first recommended hair coloration agent.

The hair coloration agent allocated to the first recommended hair coloration agent in the example on 100-4 is F8 from manufacturer MC. Therefore F8 is the second recommended hair coloration agent.

Thus the user may be recommended the hair coloration agents F2 and F8 as a cross-manufacturer hair coloration agent recommendation for achieving a desired hair color.

In various design models the user may also be recommended further hair coloration agents, for example as described above indicating those hair coloration agents which show the next smallest color difference (not shown).

Further, as described above, additional criteria can be taken into account, which may be specified by the user, e.g. that the hair coloration agent should not contain ingredients to which the user has an allergic reaction (information which might also possibly be available for the coloration agent with unknown composition 130 (e.g. as "free from" on the packaging), wash fastness etc.

The additional criteria can be provided by the user as answers to a questionnaire, for example.

In various design models the process can be carried out by employing an electronic data-processing device which has been configured for carrying out the process.

In various design models the data-processing device can be a portable data-processing device, e.g. a smartphone, tablet, iPad, a laptop or a phablet/smartlet. Alternatively a stationary computer can also be used for this purpose for example.

Software can be provided for carrying out this process, for example a computer program, especially an app.

In the context of this notification an "app" designates a computer program that is used in order to process a non-system technical functionality or to provide support. The term "app" also comprises application software for smart end devices like smartphones and tablets ("mobile app") as well as desktop application software. The app can be a native app which only works on one platform or a web, hybrid or cross-platform app which is independent of a platform.

The app can for example be downloaded via an internet platform integrated in the operating system of the smart end device in question. In the case of a smart end device using the operating system "Apple iOS" this can for example be the "App store" or in the case of a smart end device with the operating system "Android" this can be the "Google Play Store".

In various design models a website can be configured to allow at least a part of the process, e.g. the determination of the first recommended hair coloration agent, to be carried out on a further (e.g. external) data-processing device. This can be especially advantageous in cases where the electronic data-processing device has a relatively small capacity, e.g. if a smartphone or tablet etc. is used. Otherwise, the updating or maintenance of an externally stored database, for example a centrally administered database which carries out the allocation of the hair coloration agent with unknown composition to the hair coloration agent with known composition, can be simplified. For example, with an externally stored database, e.g. a centrally administered database, information can easily be supplemented at a later date, for example new products, new test results for current products etc.

The website can for example be opened in a web browser which is installed on the portable data-processing device.

In various design models the data-processing device can have a touch-sensitive screen, which may for example be used to record a desired hair color and/or to show the expected color result.

Figure 2:
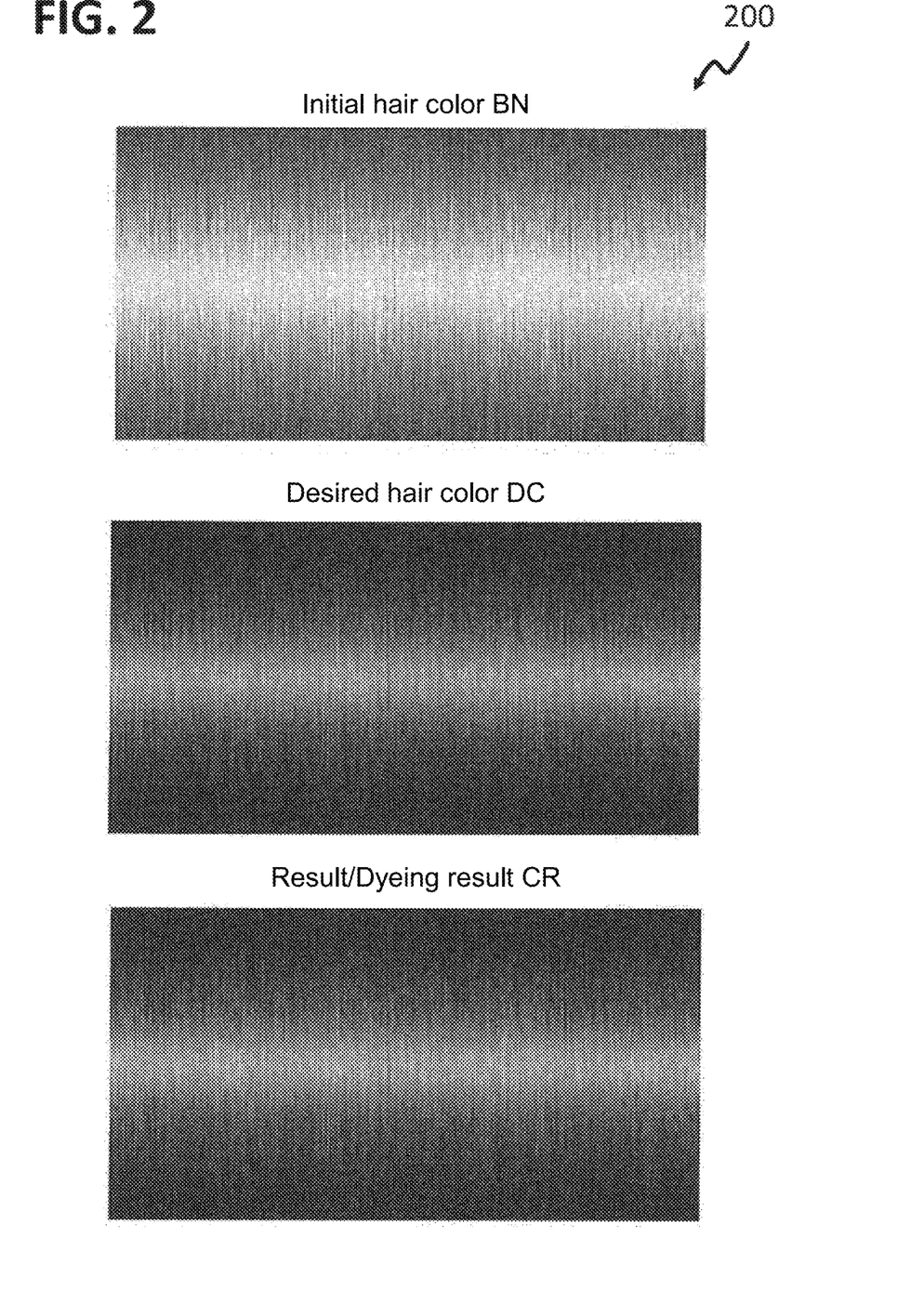
FIG. 2 an exemplary presentation of a color result through use of a recommended hair coloration agent which has been determined according to various design models.

FIG. 2 shows an exemplary presentation 200 of the color result CR by use of a recommended hair coloration agent determined according to various design models.

Transmission of color results as colorimetric L*a*b* values can certainly be precise, but is completely abstract and therefore unsuitable for a user's assessment.

Conversion of the L*a*b* values into RGB values is also possibly not very intuitive and can give the user only a vague feel for the color result.

Therefore the coloration of a neutral-colored tress of hair (or e.g. a digital image thereof) with source and target colors can be more suitable.

Correspondingly FIG. 2 shows the hair color result as a colored tress of hair, where, by way of example, both the source hair color BN and the desired hair color DC are shown as appropriately colored tresses of hair.

Even if an assessment of the color difference between the desired hair color DC and the predicted color result CR is only possible in the colored images, a black and white representation illustrates that such a presentation e.g. on the screen of their smartphone or tablet allows the user to assess the expected color result.

Alternatively or additionally the expected color result described above can be presented to the user as a photo of themselves and where the portion in which their hair is depicted is determined in the usual way and colored with the new hair color.

In various design models other/further user information entry e.g. the answering of a questionnaire, can be carried out for example with a keyboard, a mouse and/or orally. For oral information the electronic data-processing unit can be equipped with speech-recognition software.

FIG. 3 shows a flowchart 300 of a process for the determination of a cross-manufacturer hair coloration agent recommendation according to various design models.

The process comprises the allocation of a number of hair coloration agents to respectively one standard source hair color of a number of source hair colors, where the number of hair coloration agents have a number of hair coloration agents of known composition and a number of hair coloration agents of unknown composition (in 310), a coloration of hair samples with the number of hair coloration agents, where respectively one of the hair coloration agents is applied to a hair sample with the allocated standard source hair color (in 320), a colorimetric measurement of the number of hair samples (in 330), separately for every standard source hair color a determination of a color difference between each of the number of colors, which were colored with the hair coloration agent with unknown composition and each of the colors which were colored with the number of hair coloration agents of known composition (in 340), an allocation of each of the hair coloration agents with unknown composition to one of the hair coloration agents with known composition in such a way that the color difference is minimized (in 350) for the hair coloration agents allocated to each other, a determination of the user source hair color (in 360), a determination of the user's desired hair color (in 370), a determination of a first recommended hair coloration agent, whereby agent that hair coloration agent is determined as the first recommended hair coloration agent by predictive analytics from the number of hair coloration agents of known composition, for which, when hair of the user's source color is colored, the smallest color difference between the color result and the desired hair color is to be expected (in 380), and the determination of a second recommended hair coloration agent, whereby the second recommended hair coloration agent is the hair coloration agent of unknown composition allocated to the first recommended hair coloration agent (in 390).

Further, advantageous forms of the process result from the description of the device and vice versa.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for determining a cross-manufacturer hair coloration agent recommendation comprising the steps of:
    allocating a number of hair coloration agents to respectively one standard source hair color of a number of source hair colors, wherein the number of hair coloration agents have a number of hair coloration agents of known composition and a number of hair coloration agents of unknown composition;
    coloring hair samples with the number of hair coloration agents, wherein respectively one of the hair coloration agents is applied to a hair sample with the allocated standard source hair color;
    obtaining a colorimetric measurement of the number of hair samples;
    determining separately for every standard source hair color a color difference between each of the number of colors, which were colored with the hair coloration agent with unknown composition and each of the colors which were colored with the number of hair coloration agents of known composition;
    allocating each of the hair coloration agents with unknown composition to one of the hair coloration agents with known composition in such a way that the color difference is minimized;
    determining the user source hair color;
    determining the user's desired hair color;
    determining a first recommended hair coloration agent, wherein that hair coloration agent is determined as the first recommended hair coloration agent by predictive analytics from the number of hair coloration agents of known composition, for which, when hair of the user's source color is colored, the smallest color difference between the color result and the desired hair color is to be expected; and determining a second recommended hair coloration agent, wherein the second recommended hair coloration agent is the hair coloration agent of unknown composition allocated to the first recommended hair coloration agent.

2. The method according to claim 1, wherein the respective measured color is parameterized in a color space.

3. The method according to claim 2, wherein the color space is the L*a*b* color space.

4. The method according to claim 1, wherein a number of the standard source hair colors amounts to 2,3 4 or 5.

5. The method according to claim 1, wherein determining the user's source hair color is achieved by employing a hair color measuring device.

6. The method according to claim 1, wherein determining the user's source hair color includes selecting from a number of provided source hair colors.

7. The method according to claim 1, further comprising the step of:

representing an expected color result as an image of a colored tress of hair or as a digital photo of the user, in which a portion of hair is shown as a portion of hair colored with the expected color result.

8. The method according to claim 1, wherein allocating the standard source hair color is allocated based on a specified medial scope for the respective hair color agent.

9. The method according to claim 1, wherein allocating of each of the hair coloration agents with unknown composition to one of the hair coloration agents with known composition is achieved in such a way that the allocation is only achieved for those hair coloration agents, which correspond with respect to a further pre-determined characteristic.

10. A data-processing device for carrying out a determination of a cross-manufacturer hair coloration agent recommendation, the device comprising a processor configured to:

output a value corresponding to an allocation of a number of hair coloration agents to respectively one standard source hair color of a number of source hair colors, wherein the number of hair coloration agents have a number of hair coloration agents of known composition and a number of hair coloration agents of unknown composition;

output an instruction for coloring hair samples with the number of hair coloration agents, wherein in the instruction respectively one of the hair coloration agents is to be applied to a hair sample with the allocated standard source hair color;

determine separately for every standard source hair color a color difference between each of the number of colors, which were colored with the hair coloration agent with unknown composition and each of the colors which were colored with the number of hair coloration agents of known composition;

output a value corresponding to an allocation of each of the hair coloration agents with unknown composition to one of the hair coloration agents with known composition in such a way that the color difference is minimized;

determine the user source hair color;

determine the user's desired hair color;

determine a first recommended hair coloration agent, wherein that hair coloration agent is determined as the first recommended hair coloration agent by predictive analytics from the number of hair coloration agents of known composition, for which, when hair of the user's source color is colored, the smallest color difference between the color result and the desired hair color is to be expected; and determine a second recommended hair coloration agent, wherein the second recommended hair coloration agent is the hair coloration agent of unknown composition allocated to the first recommended hair coloration agent.

11. The data-processing device in accordance with claim 10, wherein the processor is configured to exchange data with an external data-processing device and to allow at least the determination of a first recommended hair coloration agent to be carried out.

12. The data-processing device according to claim 10, wherein the data-processing device is a portable data-processing device.

13. The data-processing device according to claim 10, further comprising a touch-sensitive screen to record a desired hair color and to show the expected color result.

14. The data-processing device according to claim 10, wherein a user directs operation of the processor by employing an app.

15. The data-processing device according to claim 10, wherein a user directs operation of the processor by employing a website and an external data-processing device.

* * * * *